US007301437B2

(12) United States Patent
Sasaki et al.

(10) Patent No.: US 7,301,437 B2
(45) Date of Patent: Nov. 27, 2007

(54) KEY-LESS ENTRY SYSTEM

(75) Inventors: Yoshihiro Sasaki, Kobe (JP); Minoru Yoshimura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 149 days.

(21) Appl. No.: 10/163,083

(22) Filed: Jun. 5, 2002

(65) Prior Publication Data

US 2002/0190842 A1 Dec. 19, 2002

(30) Foreign Application Priority Data

Jun. 6, 2001 (JP) ............................ 2001-171462

(51) Int. Cl.
*H04Q 1/00* (2006.01)

(52) U.S. Cl. ............... 340/5.72; 340/5.64; 340/426.36; 340/825.69

(58) Field of Classification Search ........... 340/426.16, 340/426.17, 426.28, 426.36, 5.72, 5.62, 5.64, 340/426.26; 307/10.5
See application file for complete search history.

(56) References Cited

U.S. PATENT DOCUMENTS 4,835,533 A * 5/1989 Akutsu ....................... 340/5.3
4,866,417 A * 9/1989 DeFino et al. ............. 307/10.2
5,113,182 A * 5/1992 Suman et al. .............. 340/5.28
5,293,160 A * 3/1994 Kurozu et al. ............... 340/5.3
5,379,033 A * 1/1995 Fujii et al. ................. 340/5.72
5,568,120 A * 10/1996 LeMense et al. .......... 307/10.2
5,614,769 A * 3/1997 Kuroda ...................... 307/10.2
5,679,984 A * 10/1997 Talbot et al. ............. 340/5.72
5,835,022 A * 11/1998 Amano ...................... 340/5.72
5,850,173 A * 12/1998 DiCroce et al. ....... 340/426.25
5,887,466 A * 3/1999 Yoshizawa ................... 70/257
5,973,611 A * 10/1999 Kulha et al. ............... 340/5.72
6,002,341 A * 12/1999 Ohta et al. ................. 340/5.72
6,140,938 A * 10/2000 Flick ..................... 340/825.69
6,194,997 B1 * 2/2001 Buchner et al. ....... 340/426.26
6,304,168 B1 * 10/2001 Ohta et al. ................. 340/5.72

(Continued)

FOREIGN PATENT DOCUMENTS

JP 5-156851 6/1993

(Continued)

OTHER PUBLICATIONS

Korea Office Action, dated Jul. 29, 2004, for corresponding Korean patent Application No. 10-2002-0030523 (with English translation).

(Continued)

*Primary Examiner*—Edwin C. Holloway, III
(74) *Attorney, Agent, or Firm*—Christie, Parker & Hale, LLP

(57) ABSTRACT

A key-less entry system including a transmitter for transmitting a door lock signal, and a vehicle onboard unit for executing a door automatic lock by detecting that a driver side door has made a transition from an open state to a closed state after reception of the lock signal. Accordingly, once the onboard unit is set to automatic lock mode by operating the transmitter, there is no need to again operate the transmitter and transmit a lock request after finishing work, but the door lock is automatically executed when the door is closed.

21 Claims, 15 Drawing Sheets

U.S. PATENT DOCUMENTS

| | | | | |
|---|---|---|---|---|
| 6,476,517 | B1 * | 11/2002 | Okada | 307/10.2 |
| 7,068,146 | B2 * | 6/2006 | Sasaki et al. | 340/5.72 |
| 2001/0026214 | A1 * | 10/2001 | Onuma et al. | 340/5.72 |

FOREIGN PATENT DOCUMENTS

| | | | |
|---|---|---|---|
| JP | 9132114 | * | 5/1997 |
| JP | 9-217534 | | 8/1997 |
| JP | 10-196181 | | 7/1998 |
| JP | 2000064678 | | 2/2000 |
| JP | 2000352243 | | 12/2000 |

OTHER PUBLICATIONS

Patent Abstracts of Japan for Publication No. 2000352243, publication date Dec. 19, 2000, in the name of Mitsuyoshi Masayuki.

Patent Abstracts of Japan for Publication No. 2000064678, publication date Feb. 29, 2000, in the name of Yoshimura Minoru et al.

* cited by examiner

KEY-LESS ENTRY SYSTEM

CROSS-REFERENCE TO RELATED APPLICATION

This application claims priority of Japanese Patent Application No. 2001-171462, filed on Jun. 6, 2001.

BACKGROUND OF THE INVENTION

1. Field of the Invention

The present invention relates to a key-less entry system for remotely controlling vehicle door locks by using a transmitter.

2. Prior Art

Key-less entry systems for remotely controlling vehicle doors from a distance by using a transmitter are in widespread use today because of their convenient functions. However, when a user wants to lock the vehicle doors after unloading, from the vehicle, an amount of goods that he must carry with both hands, the user has to first place the unloaded goods on the ground and then operate the transmitter to lock the doors, and this causes great inconvenience to the user. One possible solution to this would be to automatically activate the door locks a predetermined time after the closure of the last door even when a lock signal is not transmitted, but this could cause inconvenience because the doors are automatically locked, by just closing the last door, when the user has no intention of locking the doors.

To avoid such a situation, the system disclosed in Japanese Unexamined Patent Publication No. 9-217534 is configured so that automatic locking will be permitted when an unlock request is transmitted using a transmitter after the doors are closed. However, in the system disclosed in Japanese Unexamined Patent Publication No. 9-217534, as the transmitter has to be operated once again to perform the automatic lock after the doors are closed, the earlier described problem cannot be solved, that is, when the user's hands are occupied, the user has to first place the goods on the ground and then operate the transmitter. Prior art examples of automatic lock functions include those employed in the systems disclosed in Japanese Unexamined Patent Publication Nos. 5-156851 and 10-196181. In the former system, a portable transmitter and a receiver each incorporate a transmitting/receiving circuit, and a weak search signal is transmitted at periodic intervals from the receiver, with provisions made to lock the doors unless the portable transmitter receives this search signal and returns an ID code to the receiver. According to this prior art system, when the user carrying the portable transmitter moves away from the vehicle, the portable transmitter goes out of the range of the search signal being transmitted from the receiver, and hence, does not return the ID code; in this way, the doors can be locked automatically without operating the transmitter. However, the disadvantage with this system is that the configuration becomes complex and the cost increases because both the portable transmitter and the receiver have to be equipped with a transmitting/receiving circuit.

On the other hand, the system disclosed in Japanese Unexamined Patent Publication No. 10-196181 solves the problem of the system disclosed in Japanese Unexamined Patent Publication No. 5-156851 by making provisions to normally lock the doors upon reception of a lock request from the transmitter and to switch to an automatic lock mode only when prescribed conditions are satisfied. According to this prior art system, neither the portable transmitter nor the receiver need be provided with a transmitting/receiving circuit, and an automatic lock function reflecting the intention of the user can be achieved with simple configuration. However, the system disclosed in Japanese Unexamined Patent Publication No. 10-196181 requires extremely complicated conditions to activate the automatic lock mode. That is, in this system, the automatic lock mode is activated only when all the prescribed conditions are satisfied, including the condition (1) that the driver enters the vehicle and drives the vehicle and the condition (2) that the unlock switch on the transmitter is operated twice after finishing the driving of the vehicle. Accordingly, it is not easy to activate the automatic lock mode, and the drawback is, for example, the user cannot switch the mode to the automatic lock mode, when the user so desires, without starting the vehicle.

SUMMARY OF THE INVENTION

It is, accordingly, an object of the present invention to provide a key-less entry system which, without increasing the complexity of the system, can automatically lock vehicle doors easily even when the user finds it difficult to operate the transmitter, for example, when the user is holding a large amount of goods with both hands.

To solve the above-described problem, the present invention provides a key-less entry system comprising a transmitter for transmitting a door lock signal, and a vehicle onboard unit for executing an automatic door lock by detecting that a driver side door has made a transition from an open state to a closed state after reception of the lock signal.

The present invention also provides a key-less entry system comprising a transmitter for transmitting a door lock signal and an automatic lock signal, and a vehicle onboard unit for executing an automatic door lock by detecting that a driver side door has made a transition from an open state to a closed state after reception of the automatic lock signal.

In the above key-less entry systems, once the lock signal or the automatic lock signal is transmitted by operating the transmitter while keeping the driver side door open or before opening the driver side door, the doors are automatically locked when the driver side door is closed. Accordingly, when the user finds it difficult to operate the transmitter, for example, because his hands are occupied, the user need not operate the transmitter to lock the doors and this greatly enhances the usability of the system when locking the doors.

In the system of the present invention, the automatic lock is executed when the door has made a transition from the open state to the closed state within a predetermined time after reception of the lock signal. This prevents the door from being automatically locked by an erroneous operation. Further, when the lock signal is received, the door automatic lock is executed by waiting a predetermined time after detecting that the door has made a transition from the open state to the closed state. With this provision, if the door is closed when the transmitter or other important item is inadvertently left inside the vehicle, the user can open the door and retrieve the transmitter or the like if he notices within the predetermined time.

The system of the present invention further includes an annunciating means for annunciating its status by means of a buzzer, voice, or flashing of light when the automatic lock is set or when, despite the automatic lock being set, the lock cannot be executed or the execution of the lock is meaningless because a door other than the driver side door is open. This further enhances the usability of the key-less entry system.

BRIEF DESCRIPTION OF THE DRAWINGS

FIG. 1(*b*) is a diagram showing the configuration of the key-less entry system, particularly a vehicle onboard unit, according to one embodiment of the present invention;

DESCRIPTION OF THE PREFERRED EMBODIMENTS

The preferred embodiments of the present invention will be described below with reference to the accompanying drawings.

Figure 1B:
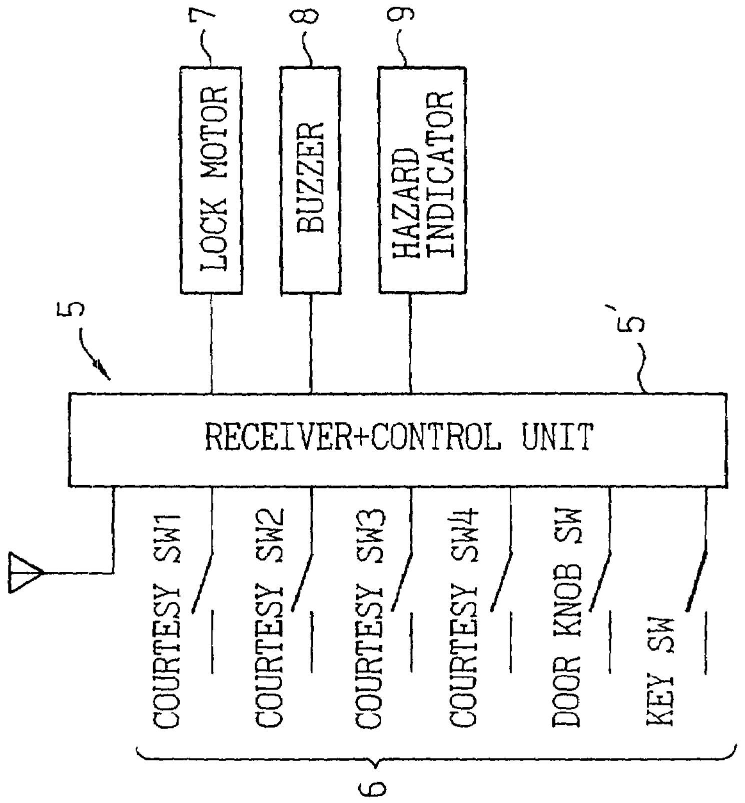
FIG. 1(*a*) is a diagram showing the configuration of a key-less entry system, particularly a transmitter, according to one embodiment of the present invention.
Figure 1A:
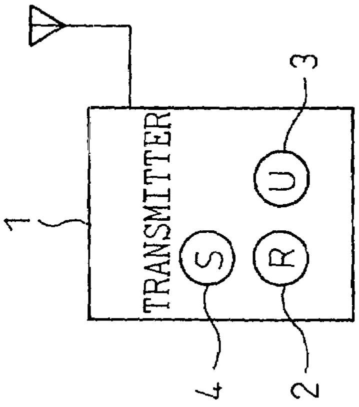

FIG. 1 is a block diagram showing in simplified form the configuration of a key-less entry system according to one embodiment of the present invention. Here, FIG. 1(*a*) shows the configuration of a transmitter, and FIG. 1(*b*) shows the configuration of a vehicle onboard unit. The transmitter 1, usually designed as a portable transmitter, includes a lock button 2 for transmitting a door lock request, an unlock button 3 for transmitting a door unlock request, and a shift button 4 for expanding the button function, and specific signals are transmitted when the specific buttons are operated. The onboard unit 5 is mounted in a vehicle, and includes a receiver for receiving the signals transmitted from the transmitter 1 and a control unit 5' for controlling door lock mechanisms. The door lock mechanisms include switches 6, including door courtesy switches SW1, SW2, SW3, and SW4 and door knob switch SW provided in doors such as the driver side door, passenger side door, rear right door, and rear left door, and a key switch SW indicating the state of the ignition key, a lock motor 7 for driving the lock mechanism of each door, and a buzzer 8 and hazard indicator (for example, a hazard lamp) 9 for annunciating a door lock fault status. As a matter of course, the transmitter 1 and the onboard unit 5 are each equipped with an antenna for transmitting and receiving signals.

Figure 2:
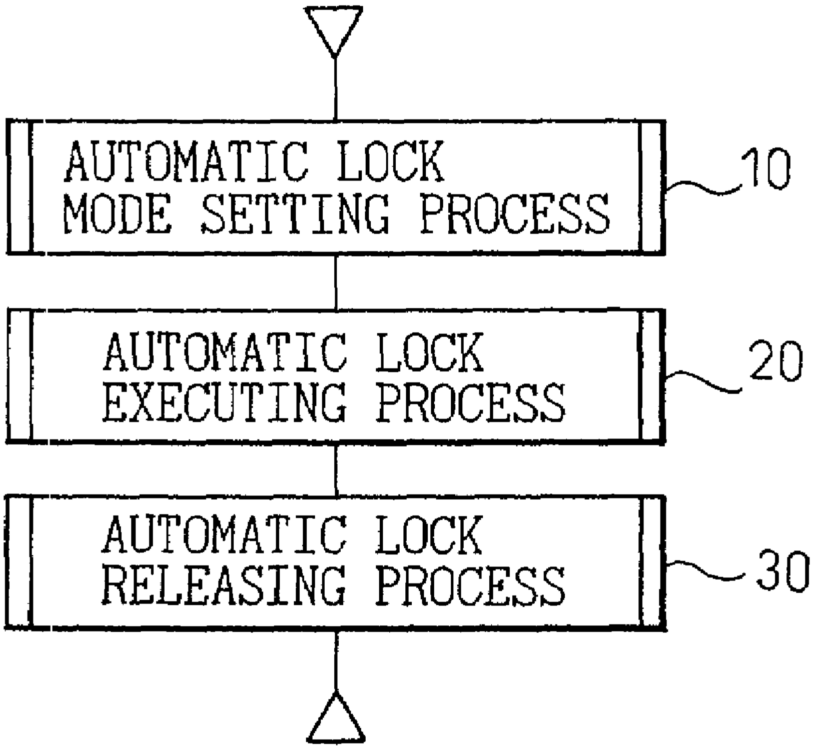
FIG. 2 is a block diagram showing the structure of a receiver program for the key-less entry system according to one embodiment of the present invention.

FIG. 2 shows the structure of a receiver program for controlling the CPU incorporated in the control unit 5 of the onboard unit. As shown, this program includes a process block 10 for setting an automatic lock mode, a process block 20 for executing the automatic lock, and a process block 30 for releasing the automatic lock.

Figure 3:
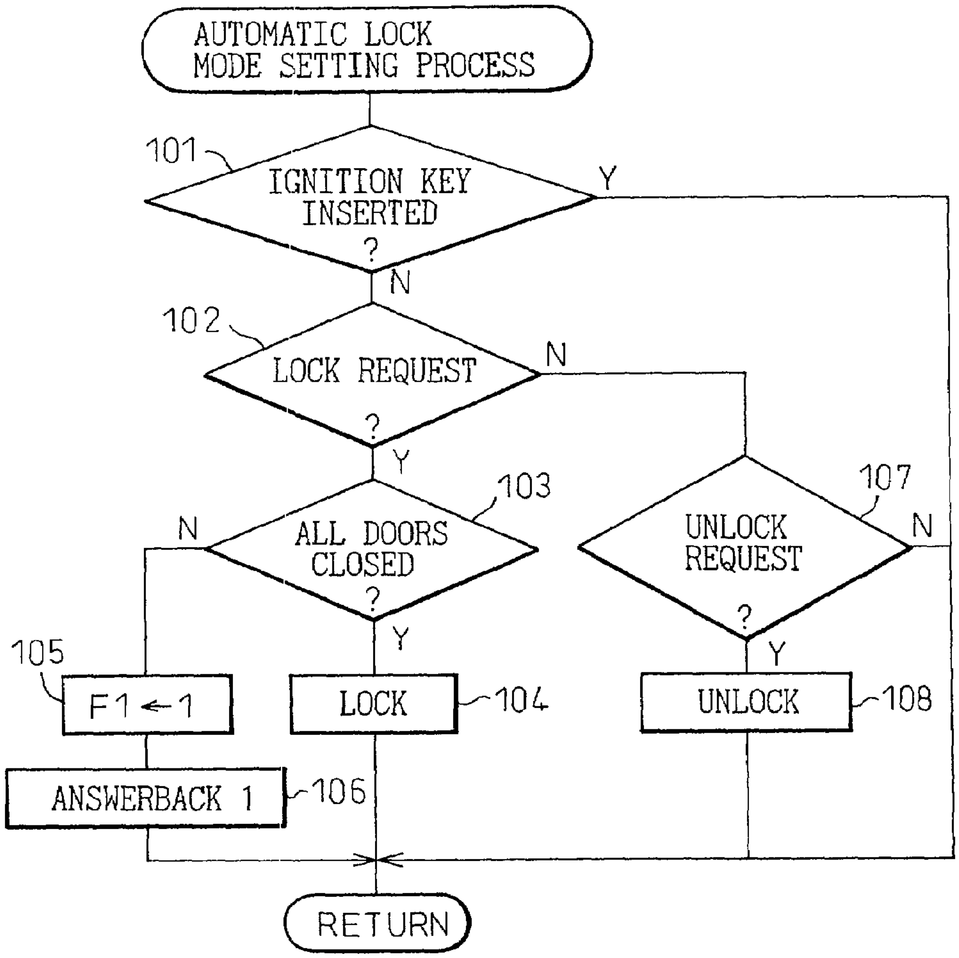
FIG. 3 is a flowchart illustrating a first embodiment of an automatic lock mode setting process in the key-less entry system according to the one embodiment of the present invention.

Next, various embodiments of automatic lock mode setting programs will be described with reference to the flowcharts of FIGS. 3 to 14. The flowchart of FIG. 3 shows a first embodiment of the automatic lock mode setting process block 10. The feature of this embodiment is that the automatic lock mode is set when a lock request is received from the portable transmitter while a door is open. First, in step 101, it is determined whether the ignition key is inserted in the ignition key cylinder. If the key is not inserted (N), then in step 102 it is determined whether a lock request is received from the transmitter. If the lock request is received (Y), it is determined in step 103 whether all the vehicle doors are closed. If all the doors are closed (Y), the doors are locked in step 104.

If it is determined in step 103 that any one of the doors is open (N), an automatic lock mode flag F1 is set in step 105, thus setting the automatic lock mode. Next, in step 106, an answerback is produced, for example, by sounding the buzzer twice in one second (see answerback 1 in FIG. 15), to indicate to the user that the automatic lock mode has been set. Instead of sounding the buzzer, a voice message saying, for example, "The door will be automatically locked when closed" may be produced as the answerback. On the other hand, if it is determined in step 102 that a lock request is not received (N), then in step 107 it is determined whether a door unlock request is received; if the unlock request is received (Y), the door is unlocked in step 108. If it is determined in step 101 that the ignition key is inserted in the key cylinder (Y), or if it is determined in step 107 that an unlock request is not received (N), the process flow is terminated without performing the door lock operation.

As described above, in this embodiment, the automatic lock mode is set when a lock request is received while any one of the doors is open; accordingly, when unloading from the vehicle such an amount of goods that the user has to hold it with both hands, if a lock request is made beforehand while leaving the door open, the automatic lock will be executed when the door is closed after unloading the goods (the user can close the door even if his hands are occupied). This saves the user the trouble of operating the portable transmitter while holding the goods with his hands. Furthermore, since there is no concern of the door being locked against the intention of the user when he is unloading the goods with the door left open, the user can continue to work safely. For the automatic door lock execution, refer to various embodiments of the automatic door lock executing process to be described later.

Figure 4:
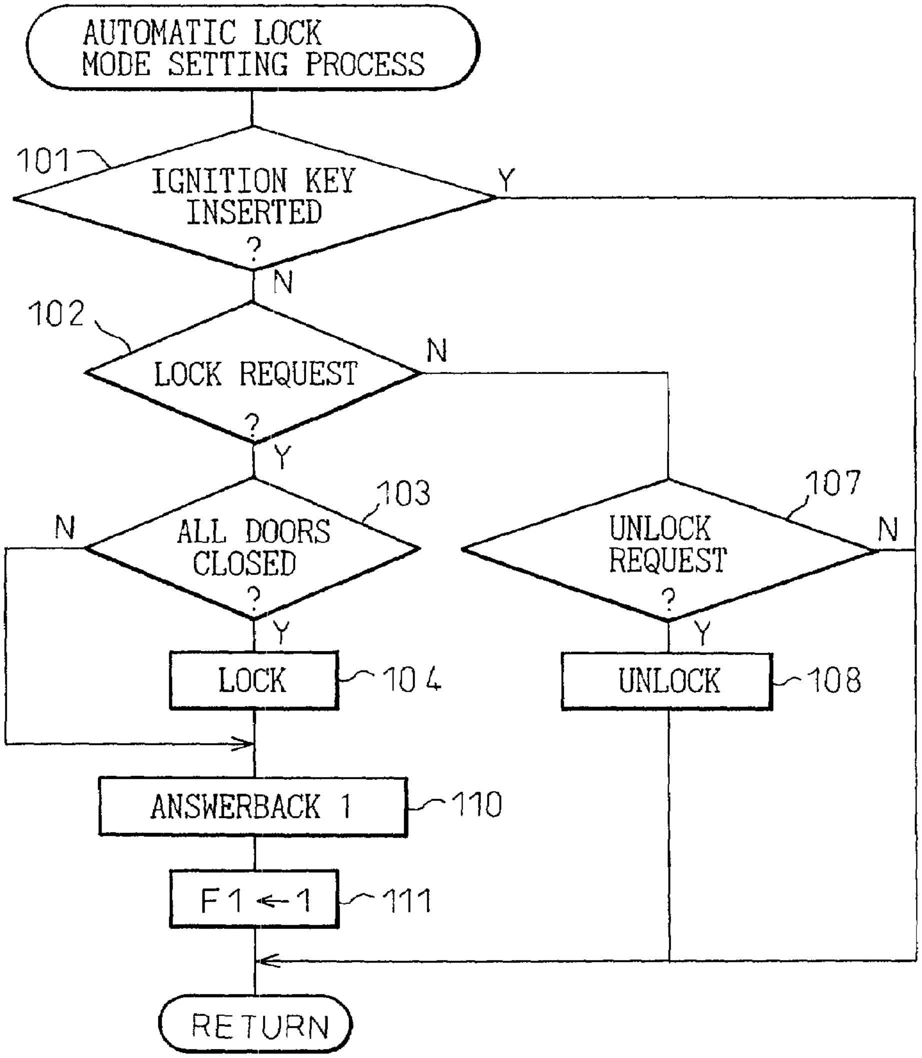
FIG. 4 is a flowchart illustrating a second embodiment of the automatic lock mode setting process in the key-less entry system according to one embodiment of the present invention.

FIG. 4 is a flowchart illustrating a second embodiment of the automatic lock mode setting process block 10. The feature of this embodiment is that, unlike the first embodiment shown in FIG. 3, the automatic lock mode is set whenever a door lock request is received, regardless of whether the doors are opened or closed. To accomplish this, in this embodiment, upon determining in step 103 that all the doors are closed, the door lock is executed in step 104, the answerback 1 (see FIG. 15) is produced in step 110, for example, by sounding the buzzer twice, and the automatic lock mode is entered in step 111. If it is determined in step 103 that any one of the doors is open, step 104 is skipped, and steps 110 and 111 are carried out to enter the automatic lock mode. In this and subsequent embodiments, step 103, where determination is made as to whether all the doors are closed, need not necessarily be provided, depending on the design of the lock mechanism. For example, if the design of the lock mechanism is such that the door lock is executed even if all the doors are not closed, this step can be omitted. Furthermore, the answerback step 110 may be omitted (because it may be a nuisance when locking the door in the normal mode), or may be placed immediately after the N exit of step 103 so that the buzzer will be sounded only when any one of the doors is open.

This embodiment, unlike the first embodiment shown in FIG. 3, assumes the case where the user operates the transmitter to set the automatic lock mode while sitting inside the vehicle before opening the driver side door, and thereafter opens the door to get out of the vehicle.

Figure 5:
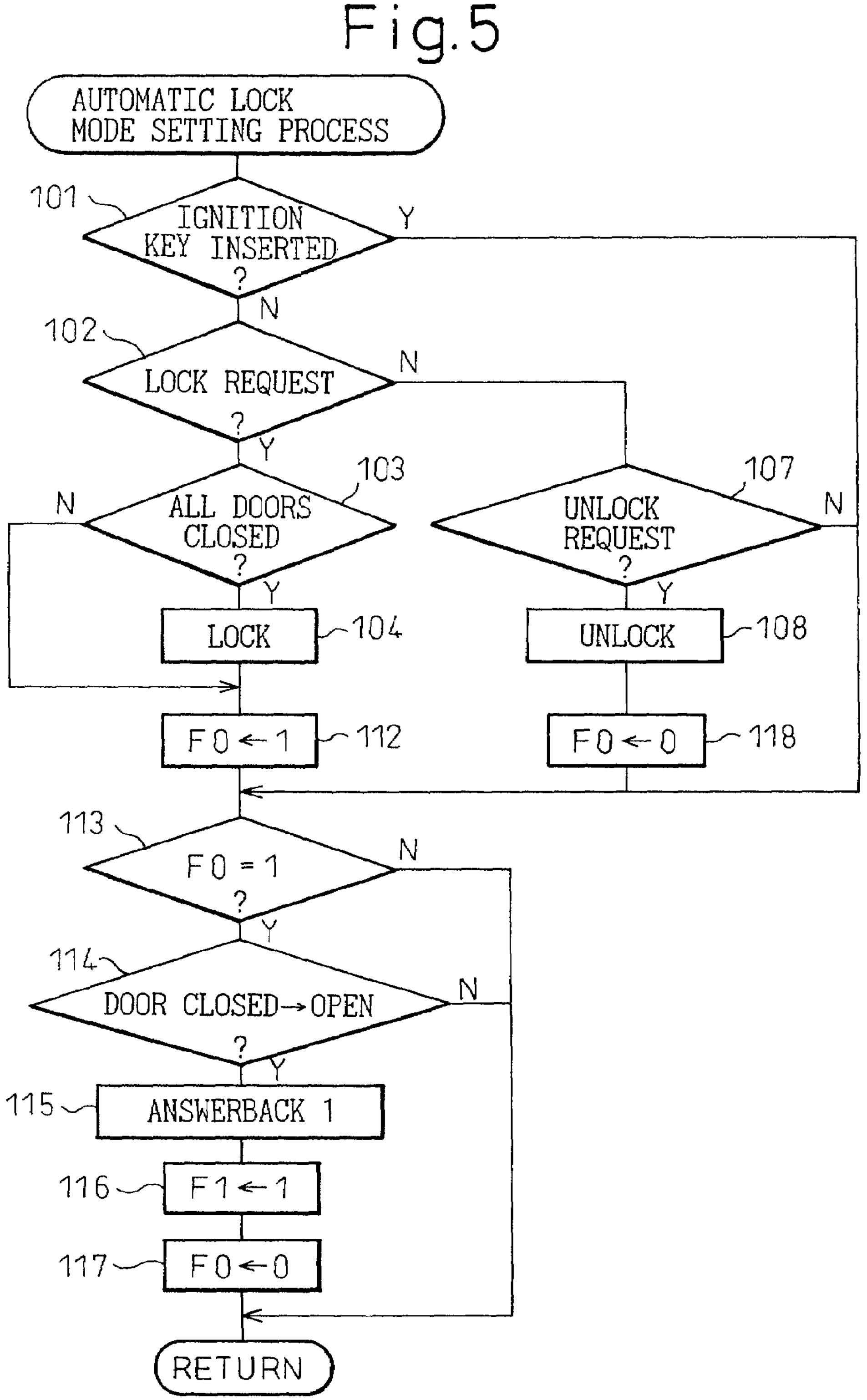
FIG. 5 is a flowchart illustrating a third embodiment of the automatic lock mode setting process in the key-less entry system according to one embodiment of the present invention.

FIG. 5 is a flowchart illustrating a third embodiment of the automatic lock mode setting process block 10. This embodiment is a modification of the second embodiment shown in FIG. 4. The feature of this embodiment is that when a lock request is received from the transmitter, an automatic lock mode preparation flat F0 is set (F0 1) in step 112 to enter an automatic lock preparation state, regardless of whether the doors are open or closed, and when it is confirmed in step 113 that the flag F0 is set to 1 and in step 114 that the driver side door is opened, the automatic lock mode flag F1 is set in step 116 to enter the automatic lock mode. Accordingly, in this embodiment, if the door is not opened after reception of the lock request from the transmitter, the automatic lock mode is not set. Here, step 115 is the step of producing the answerback 1, step 116 is the step of setting the automatic lock mode, and step 117 is the step of clearing the automatic lock mode preparation flag to exit the preparation state. If the door is unlocked in step 108, the automatic lock mode preparation flag F0 is set to 0 in step 118 to ensure that the automatic lock mode is not entered.

Figure 6:
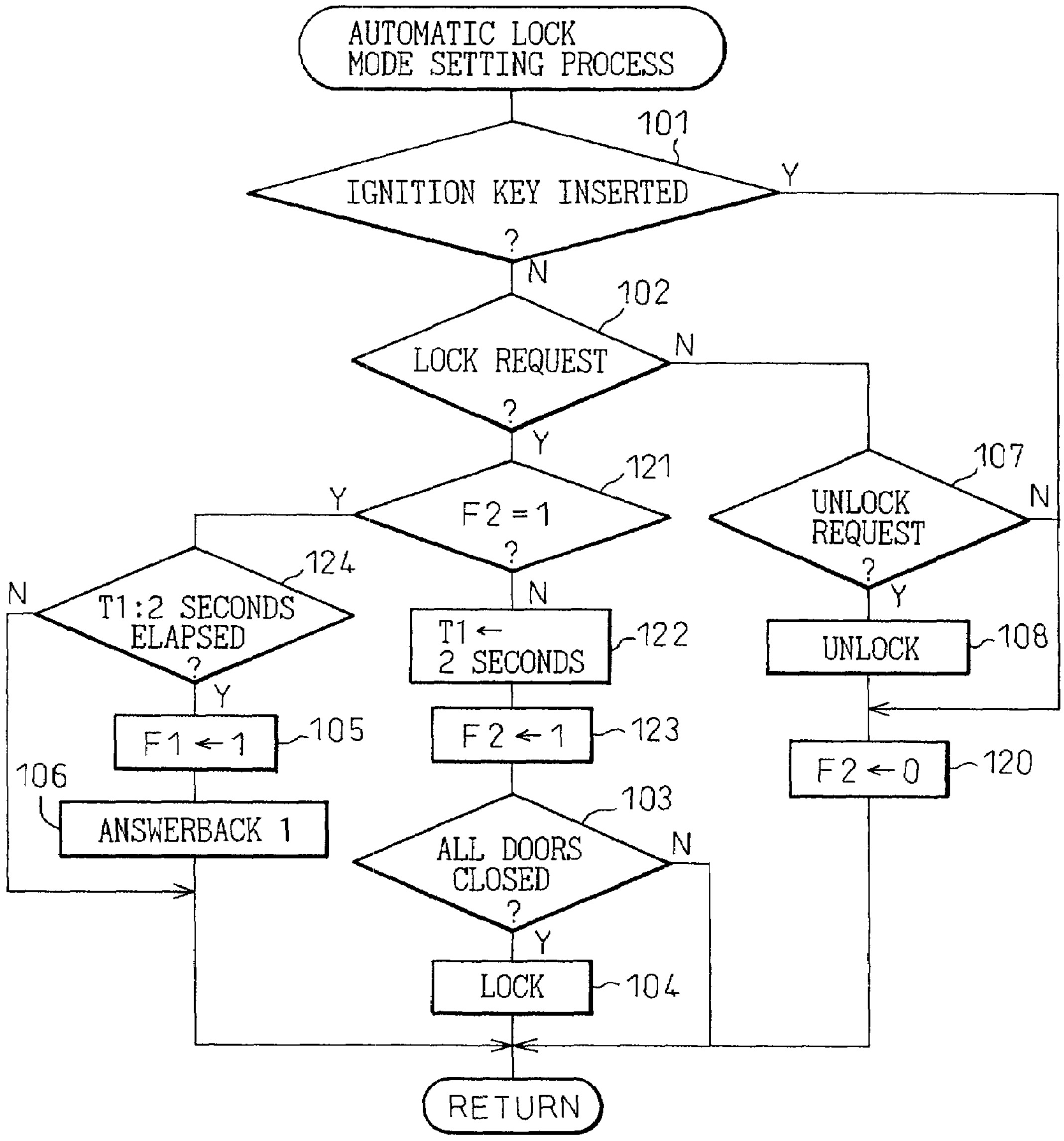
FIG. 6 is a flowchart illustrating a fourth embodiment of the automatic lock mode setting process in the key-less entry system according to one embodiment of the present invention.

FIG. 6 is a flowchart illustrating a fourth embodiment of the automatic lock mode setting process block 10. The feature of this embodiment is that the automatic lock mode is entered if the lock request from the transmitter has continued for two seconds (programmable) in the process flow of the first embodiment shown in FIG. 3. In the flowchart of FIG. 6, if the ignition key is inserted in the ignition switch, or if there is no lock request, that is, in the normal condition, a lock signal receiving flag F2 is set to 0 in step 120, indicating that no lock signal is received. In this condition, if a lock request is detected in step 102 for the first time, F2=0 is detected in step 121 which is the step of detecting the state of the lock signal receiving flag F2. Accordingly, the N branch of step 121 is followed to proceed to step 122 to set a timer T1 to two seconds and, in step 123, the lock signal receiving flag F2 is set to 1. After that, when it is determined in step 103 that all the doors are closed (Y), the door lock is executed in step 104. If any one of the doors is open in step 103 (N), the process loops back.

In this embodiment, as the lock request is being transmitted continuously, the answer in the next step 102 is Y. In step 121, the state of the lock signal receiving flag F2 is detected; in this case, as the flag F2 is already set to 1 in step 123 in the previous loop, the answer in step 121 is Yes (Y). Then, in step 124, the timer T1 is checked to see if two seconds have elapsed. If two seconds have elapsed, then in step 105 the automatic lock mode flag F1 is set to 1 to enter the automatic lock mode, and the answerback 1 (see FIG. 15) is produced in step 106. The answerback may, of course, be produced using a voice message that says "The door will be automatically locked when closed". If two seconds have not yet elapsed in step 124, the process returns to step 101 to wait until the time elapses. Here, in step 124, the condition may be such that two seconds elapse "with the door left open". With the above processing, when the lock request has continued for two seconds (programmable) or longer, the automatic lock mode is set.

Figure 7:
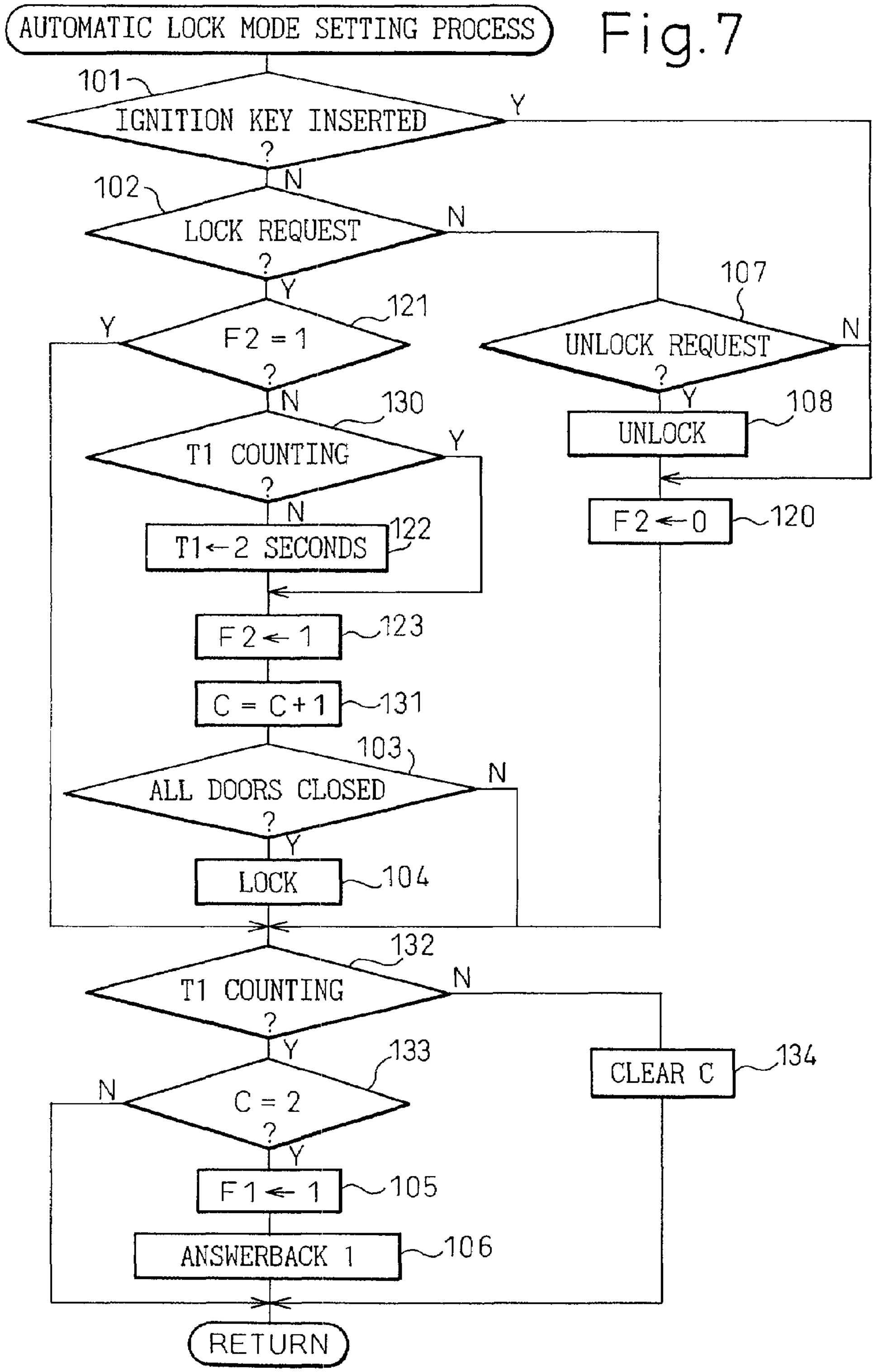
FIG. 7 is a flowchart illustrating a fifth embodiment of the automatic lock mode setting process in the key-less entry system according to one embodiment of the present invention.

FIG. 7 is a flowchart illustrating a fifth embodiment of the automatic lock mode setting process block 10. In this embodiment, the automatic lock mode is set when the lock request is received twice in succession within two seconds. This embodiment will be described in detail with reference to the flowchart. If there is no lock request from the transmitter, the lock signal receiving flag F2 is set to 0 (the flag is cleared) in step 120, regardless of whether an unlock request is received or not, and the value of a counter C for counting the lock request is cleared in step 134. In this condition, when the lock request is received for the first time, it is determined in step 102 that there is a lock request (Y), and the value of the lock signal receiving flag F2 is detected in step 121.

As the value of F2 at this time is 0 (N), as described above, the process proceeds to step 130 to determine whether the timer T1 is counting or not. As this lock request is the first received lock request, the answer to the decision in step 130 is N, and in the next step 122, the timer T1 is set to two seconds. Further, in step 123, the lock signal receiving flag F2 is set to 1, and in step 131, the value of the clock request counter C is incremented by 1. The counter value before being incremented is 0 because the value was cleared in step 134 as described above; as a result, the value when incremented is 1. Next, in step 103, it is determined whether all the doors are closed. If all the doors are closed, the doors are immediately locked. If it is determined in step 103 that any one of the doors is open, the door lock step 104 is skipped to proceed to the next step 132.

In step 132, it is again determined whether the timer T1 is counting or not. Since the timer T1 is counting by being set to two seconds in step 122, the process proceeds to the next step 133 to check the value of the counter C. As the value of the counter C was set to 1 in step 131, the N branch of step 133 is followed to terminate the process. After transmitting the first lock request, the transmitter temporarily stops transmission. As a result, in the next processing loop, the answer in step 102 is N, and the process proceeds to step 107 to determine whether an unlock request is received. As, in this case, there is no unlock request, the answer is N, and the process proceeds to step 120 to set the lock signal receiving flag F2 to 0, and then proceeds to step 132. The description here is given assuming the case where the lock request is transmitted twice within two seconds; therefore, it is determined in step 132 that T1 is counting, and the value of the counter C is examined in step 133. At this time, as the value of the counter C was set to 1 because of the previously lock request, the answer in step 133 is N, and the process again returns to step 101.

Next, when the lock request is received for the second time, the process proceeds through steps 102 and 121 to step 130 where it is determined whether the timer T1 is counting or not. As the timer continues counting, the answer in step 130 is Y, and the process skips to 123 where the lock signal receiving flag F2 is set to 1. Next, in step 131, the value of the counter C is incremented by 1 to 2. As a result, the answer in step 133 is Y; as a result, the automatic lock mode flag F1 is set to 1 in step 105, and the onboard unit enters the automatic lock mode. After that, the answerback 1 is produced in step 106, indicating to the user that the automatic lock mode has been entered. On the other hand, if the second lock request is received after two seconds have elapsed from the first lock request, as the counter C is already cleared because of a timeout of the timer T1 (step 132 to step 134), this lock request is regarded as the first lock request. Accordingly, if the second lock request does not arrive within two seconds, the automatic lock mode is not set.

In the above fifth embodiment, step 133 may include the condition that the door is open. In this case, steps 130 to 131 should be placed on the N branch of step 103.

Figure 8:
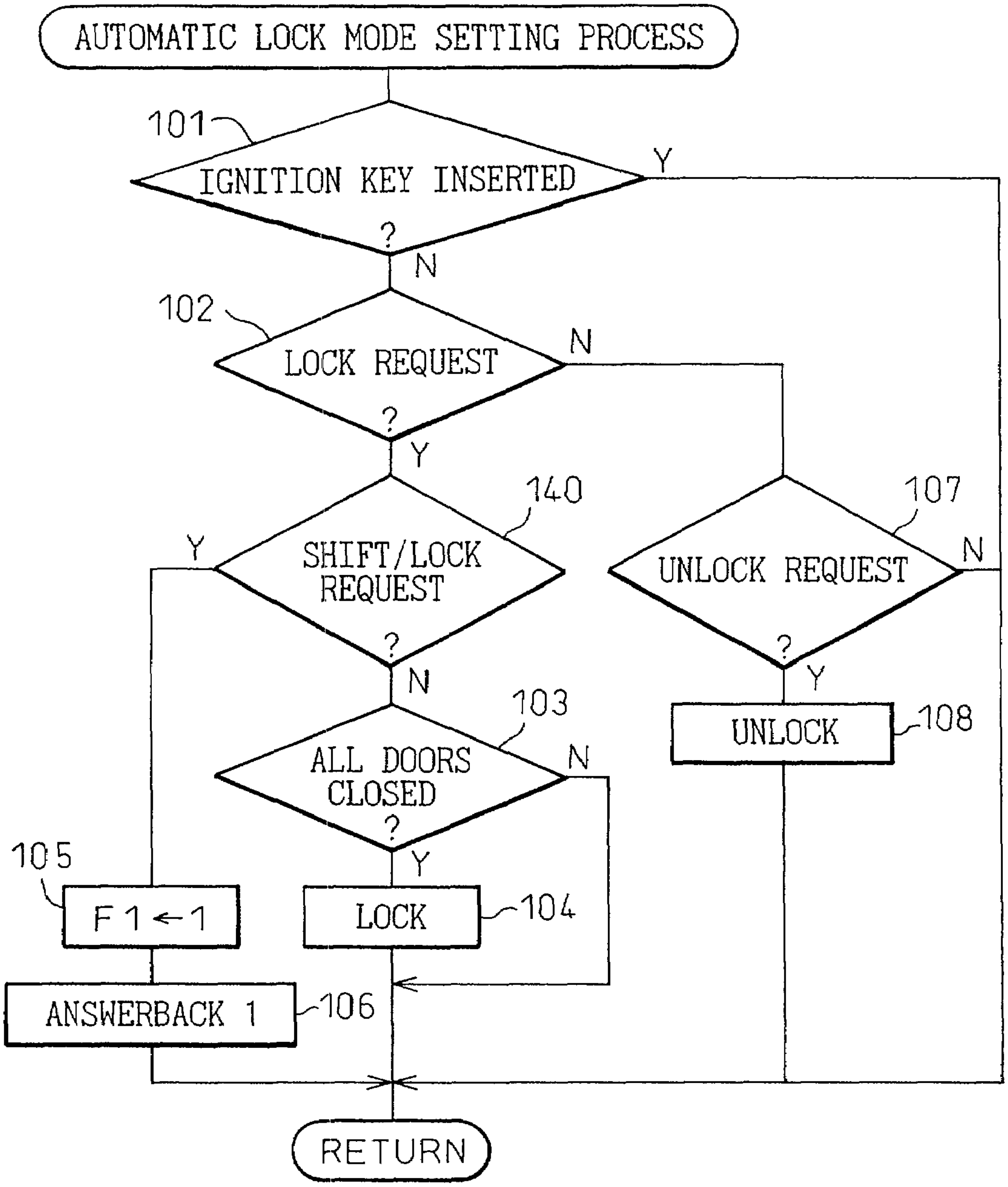
FIG. 8 is a flowchart illustrating a sixth embodiment of the automatic lock mode setting process in the key-less entry system according to one embodiment of the present invention.

FIG. 8 is a flowchart illustrating a sixth embodiment of the automatic lock mode setting process block 10. This embodiment is a modification of the first embodiment shown in FIG. 3; that is, the shift button 4 is provided on the portable transmitter, as shown in FIG. 1, and when the lock button 2 is pressed simultaneously with the shift button 4 or after pressing the shift button 4, the onboard unit is set to the automatic lock mode. Accordingly, in this embodiment, step 102, which determines whether a lock request is received is followed by step 140 which determines whether the lock request is made by the shift button/lock button combination, and if the answer is Y, the process proceeds to the automatic lock mode setting step consisting of steps 105 and 106.

Figure 9:
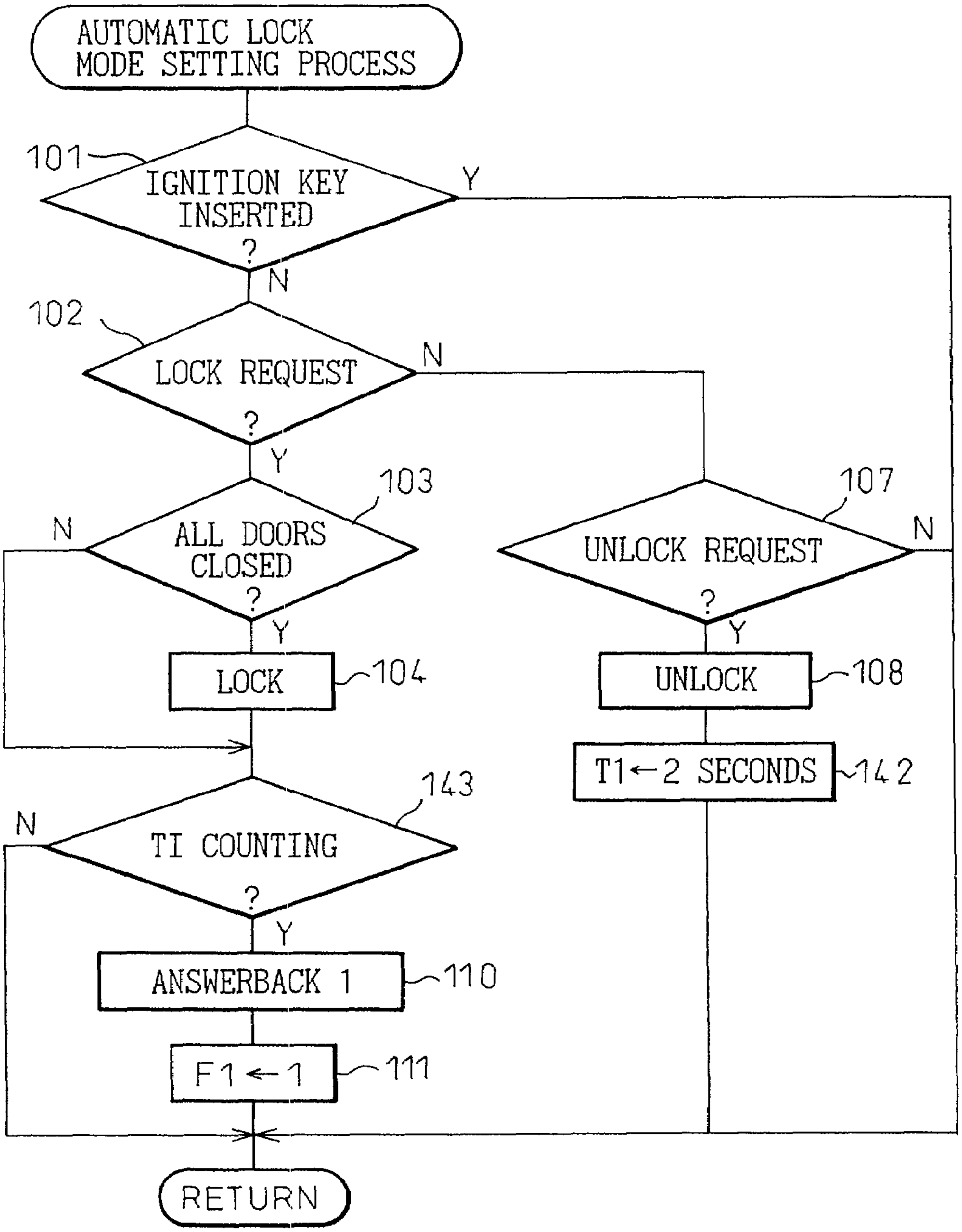
FIG. 9 is a flowchart illustrating a seventh embodiment of the automatic lock mode setting process in the key-less entry system according to one embodiment of the present invention.

FIG. 9 is a flowchart illustrating a seventh embodiment of the automatic lock mode setting process block 10. This embodiment is a modification of the second embodiment shown in FIG. 4; that is, when the lock button is pressed to set the automatic lock mode within two seconds after pressing the unlock button 3, the automatic lock mode is set. Accordingly, in this embodiment, if an unlock request is received in step 107, the door is immediately unlocked in step 108, and the timer Tl is set to two seconds in step 142. If there is a lock request before the timer Tl counts two seconds, it is determined in step 143 that the timer Tl is counting (Y); therefore, the answerback 1 is produced in step 143, and the automatic lock mode flag Fl is set in step 111 to enter the automatic lock mode. If the lock request is received after two or more seconds have elapsed from the reception of the unlock request, the answer in step 143 is N because the counter Tl has already finished counting, and the automatic lock mode setting steps 110 and 111 are skipped. Accordingly, if all the doors are closed in step 103, the doors are locked, but the automatic lock mode is not set by this lock request.

Next, various embodiments of the automatic lock executing process block 20 of FIG. 2 will be described with reference to their corresponding flowcharts.

Figure 10:
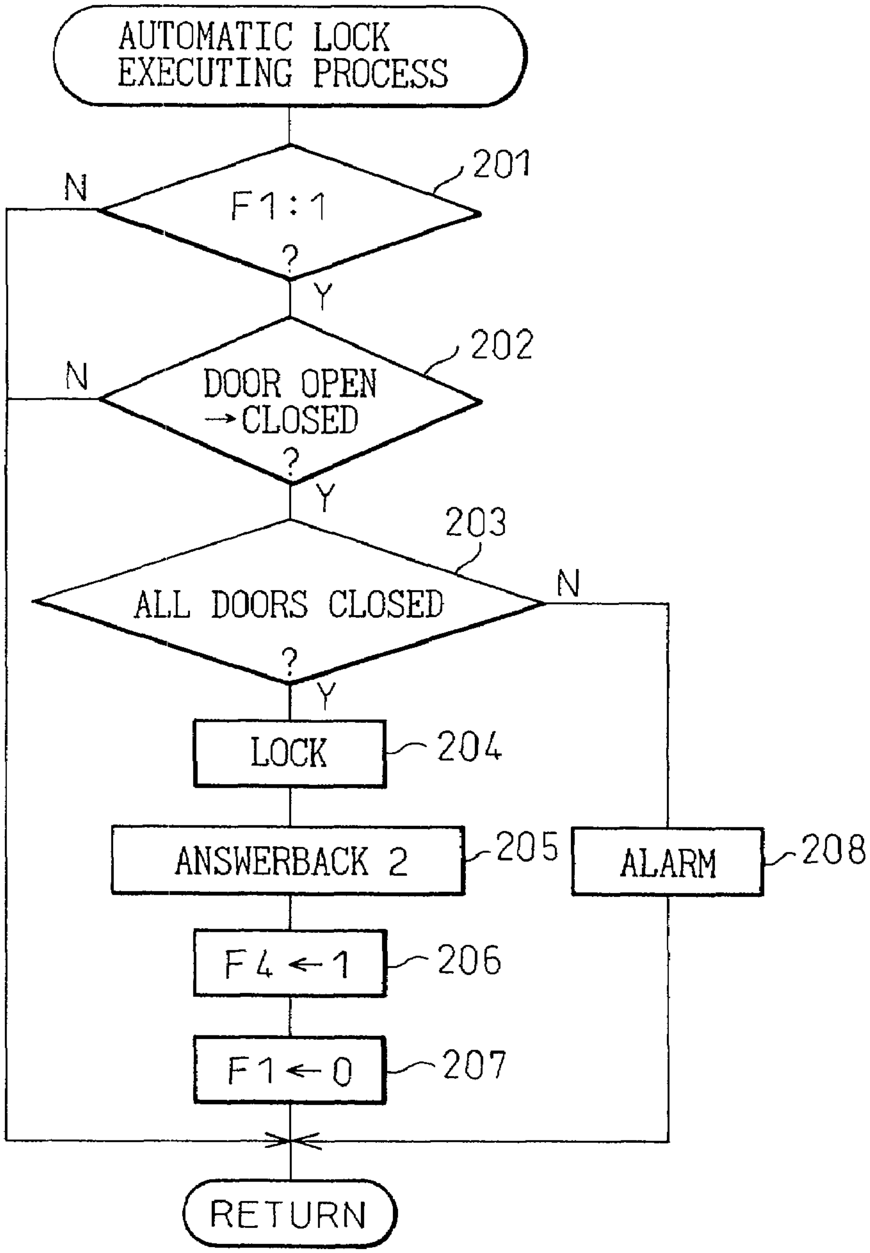
FIG. 10 is a flowchart illustrating a first embodiment of an automatic lock executing process in the key-less entry system according to one embodiment of the present invention.

FIG. 10 is a flowchart illustrating a first embodiment of the automatic lock executing process block 20. First, in step 201, it is determined whether the automatic lock mode flag F1 is set to 1. If the answer is Y, then in step 202 it is determined whether the driver side door has made a transition from an open state to a closed state. If the answer is Y, in the next step 203 it is determined whether all the vehicle doors are closed. If all the doors are closed, then all the doors are locked in step 204, and an answerback 2 with a relatively long buzzer beep (see FIG. 15) is produced in step 205 to indicate to the user that the doors have been locked. Next, in step 206, an automatic lock completion flag F4 is set to 1, and in step 207, the automatic lock mode flag F1 is set to 0. On the other hand, if any one of the doors is open in step 203, an alarm (see FIG. 15) is sounded in step 208 to warn the user to close the door. This alarm may be issued in the form of a voice warning saying, for example, “The door is open”.

Figure 11:
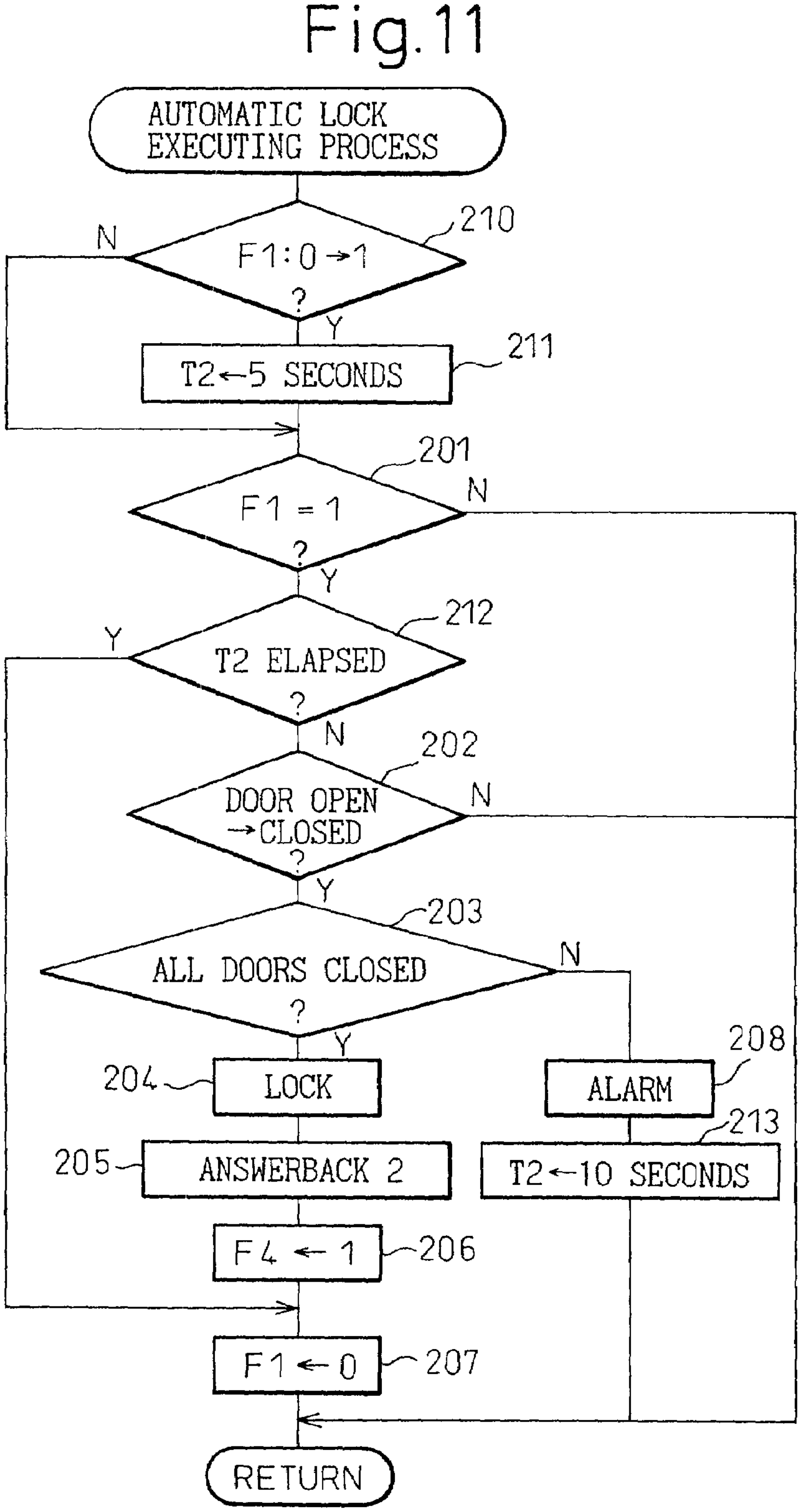
FIG. 11 is a flowchart illustrating a second embodiment of the automatic lock executing process in the key-less entry system according to one embodiment of the present invention.

FIG. 11 is a flowchart illustrating a second embodiment of the automatic lock executing process block 20. In this embodiment, the automatic lock is executed only when the driver side door is closed within five seconds after entering the automatic lock mode. If the driver side door is not closed within five seconds, the automatic lock mode is ended. Accordingly, in this embodiment, first the 0 to 1 transition of the automatic lock mode flag F1, that is, the moment that the automatic lock mode is set, is detected in step 210. Next, in step 211, timer T2 is set to five seconds (programmable). Then, in step 201, it is confirmed that the automatic lock mode flag F1 is set (Y), and in step 212, it is determined whether the timer T2 counting five seconds has counted up.

If the timer has not yet counted up to five seconds in step 212 (N), then it is determined in step 202 whether the driver side door has made a transition from the open state to the closed state. If the transition of the door from the open state to the closed state is detected (Y in step 202), it is determined in step 203 whether all the vehicle doors are closed; if the answer is Y, the doors are locked in step 204. Then, the answerback 2 is produced in step 205, the automatic lock completion flag F4 is set in step 206, and the automatic lock mode flag F1 is set to 0 in step 207 to terminate the process. If, in step 203, it is determined that any one of the vehicle doors is open (N), a warning is given by sounding an alarm in step 208. At this time, the timer T2 is set, for example, to 10 seconds in step 213. The time is set longer in order to allow the user to determine which door is open. When all the doors are closed within 10 seconds, the doors are locked.

Figure 12:
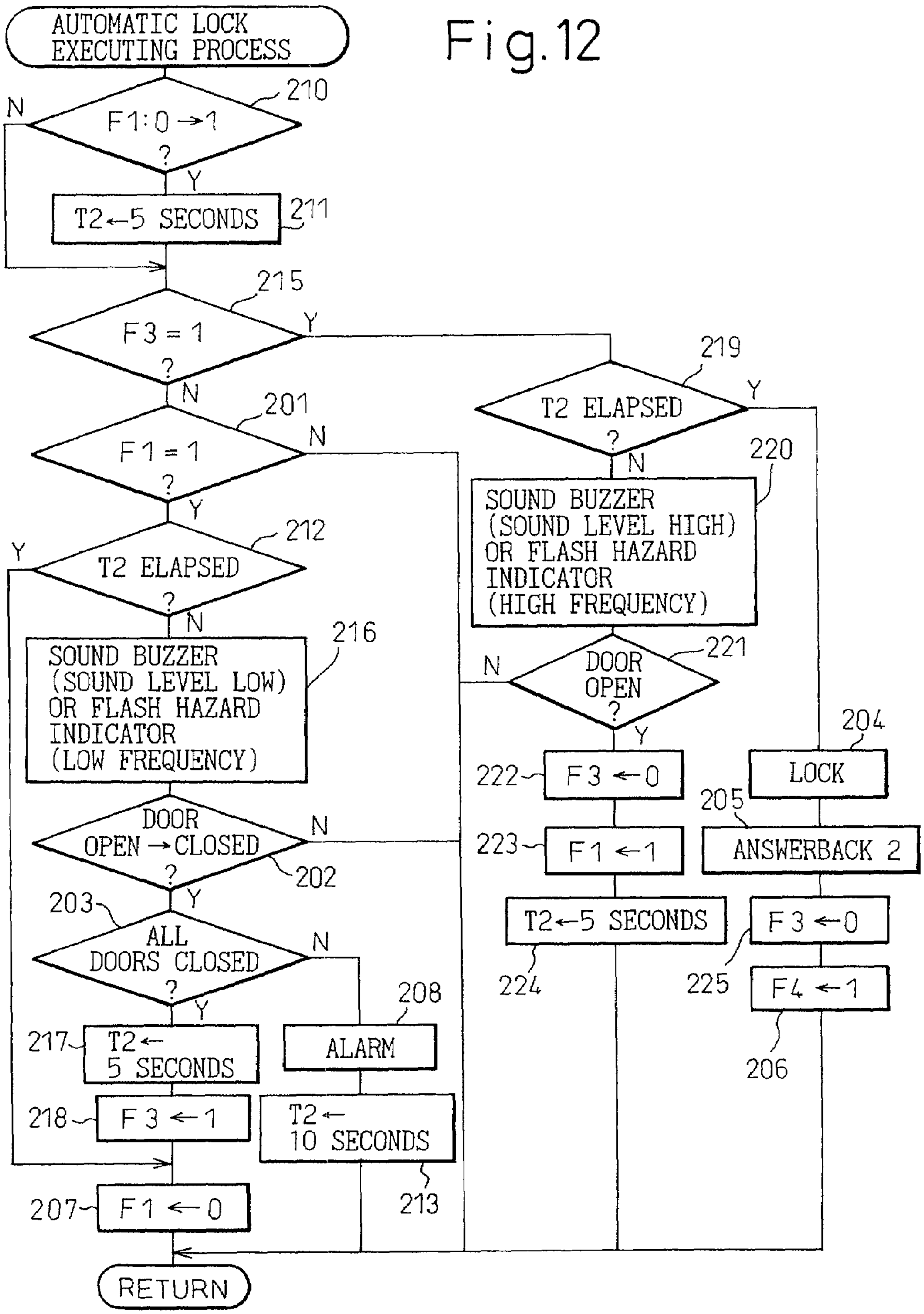
FIG. 12 is a flowchart illustrating a third embodiment of the automatic lock executing process in the key-less entry system according to one embodiment of the present invention.

FIG. 12 is a flowchart illustrating a third embodiment of the automatic lock executing process block 20. In the embodiment shown in FIG. 11, the automatic lock is executed when the door is closed within five seconds after entering the automatic lock mode; in contrast, in the third embodiment, considering the case in which the user notices after closing the door that the transmitter or other article is inadvertently left inside the vehicle, a delay is provided between the closing of the door and the execution of the automatic lock so that the lock is executed a prescribed time T2 (for example, five or ten seconds) after the closing of the door. If the door is opened within this delay time interval, the same process is repeated after all the doors are closed. In the time interval from the activation of the automatic lock mode to the completion of the automatic lock, the buzzer or the hazard indicator is activated to alert the user that the mode is set to the automatic lock mode. The sound level of the buzzer or the flashing interval of the hazard indicator may be set differently before and after the door is closed.

In the flowchart of FIG. 12, to set the delay it is determined, in step 215 which follows step 211, whether an automatic lock standby flag F3 is set or not. In the first loop executed after entering the automatic lock mode, as the flag F3 is not set (N, F3 =0), the process proceeds through step 201 to step 212 to determine whether the timer T2 has counted up. As five seconds have not elapsed yet (N), the process proceeds to step 216 to sound the buzzer (sound level low) or flash the hazard indicator (at low frequency) to indicate to the user that the mode has been set to the automatic lock mode. Next, when the transition of the driver side door from the open state to the closed state is detected in step 202 (Y), the process proceeds to step 203 to determine whether all the doors are closed; if the answer is Y, then the timer T2 is again set to five seconds in step 217, the automatic lock standby flag F3 is set to 1 in step 218 to enter the automatic lock standby state, and the automatic lock mode flag F1 is set to 0 in step 207. The operation performed when the answer is N in step 202 or step 203 is the same as that performed in the embodiment of FIG. 11, and will not be described here.

After step 207, the process loops back to step 210 to determine whether the automatic lock mode flag F1 has made a transition from 0 to 1. In this case, as the answer is N in step 210, the process skips to step 215 to determine whether the automatic lock standby flag F3 is set or not. As the flag F3 was set to 1 in step 218, the answer is Y in step 215, and the process proceeds to step 219 where it is determined whether the timer T2 has counted up. In the current state, the timer T2 has not yet counted up (N), so that the process proceeds to step 220 to sound the buzzer at a higher sound level or flash the hazard at higher frequency to alert the user to the automatic lock standby state. In this condition, if the user opens the driver side door again, for example, to retrieve the article left inside the vehicle, then the opening of the door is detected in step 221 (Y), the automatic lock standby flag F3 is set to 0 in step 222, the automatic lock mode flag F1 is set to 1 in step 223, and the timer T2 is again set to five seconds in step 224, after which the process returns to step 210. If the door is not opened in step 221 (N), the process returns via step 210 to step 219 to determine once again whether the timer T2 has counted up to five seconds. If the answer is Y in step 219, that is, if five seconds have elapsed in the automatic lock standby state, the process proceeds to step 204 to execute the door lock; then, the answerback 2 is produced in step 205, the automatic lock standby flag F3 is cleared to 0 in step 225, and the automatic lock completion flag F4 is set to 1 in step 206.

As described above, in this embodiment, in the time interval from the activation of the automatic lock mode to the completion of the automatic lock, the buzzer or the hazard indicator is activated to alert the user to the automatic lock mode; in this case, the sound level of the buzzer or the flashing interval of the hazard indicator is set differently before and after the closing of the door so that the user can better recognize the current state. Instead of sounding the buzzer, the warning may be provided using a voice message that says, for example, "The door is open".

Next, an embodiment of the automatic lock releasing process block 30 of FIG. 2 will be described with reference to a flowchart.

Figure 13:
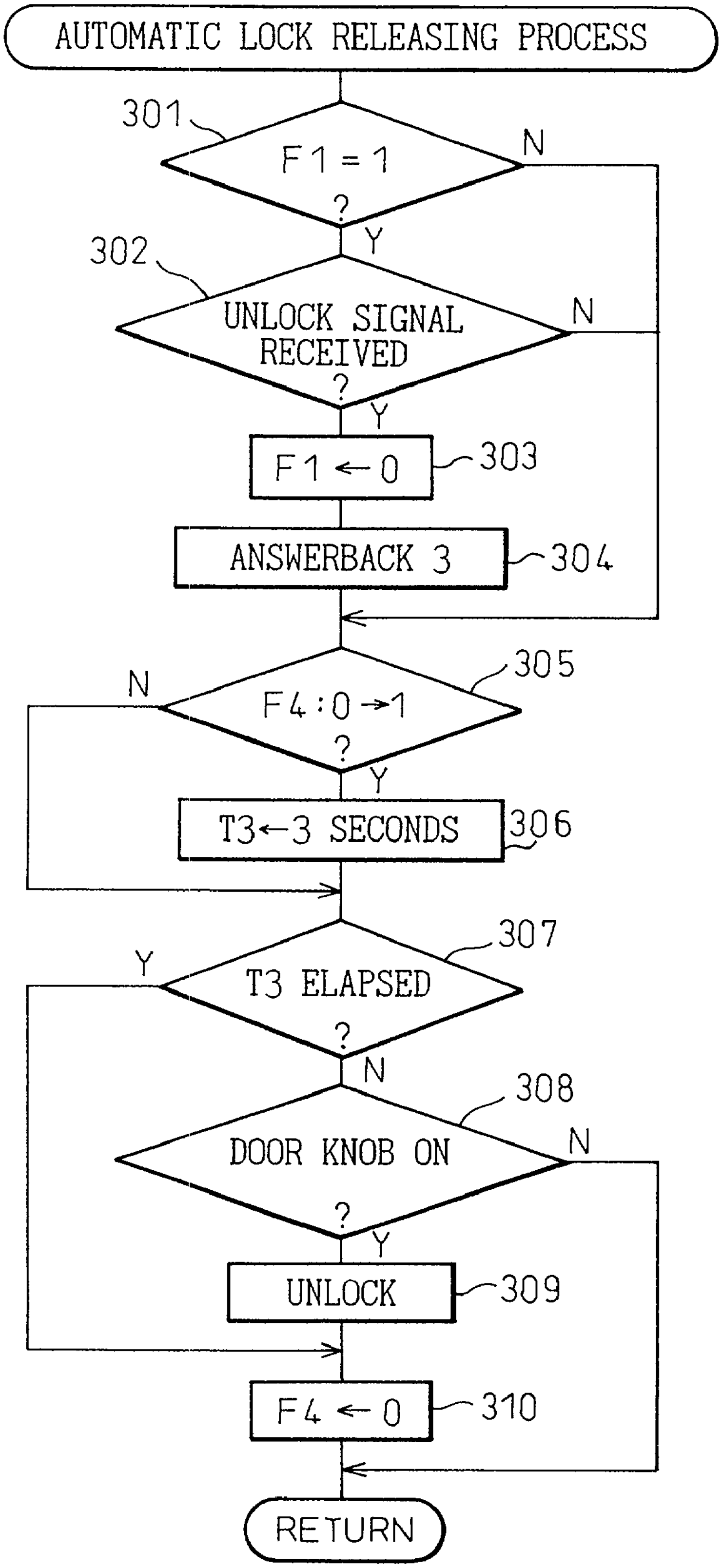
FIG. 13 is a flowchart illustrating a first embodiment of an automatic lock releasing process in the key-less entry system according to one embodiment of the present invention.

FIG. 13 is a flowchart illustrating a first embodiment of the automatic lock releasing process block 30. In this embodiment, by performing an automatic lock cancel operation, that is, by pressing the unlock button, the automatic lock mode once set can be released before the automatic lock is executed. Provisions may also be made so that the lock releasing operation can be accomplished by pressing the lock button again or by setting the automatic lock mode once again, rather than by pressing the unlock button. The embodiment shown in FIG. 13 allows for the case in which the user notices after completion of the automatic lock that the transmitter is inadvertently left inside the vehicle, and allows a predefined time (for example, three seconds) after the completion of the automatic lock so that the door can be unlocked if the door knob is pulled within the predefined time. It is desirable to apply this control to the configuration in which the door is immediately locked when it is closed.

In FIG. 13, first it is determined in step 301 whether the mode is set to the automatic lock mode. If the automatic lock mode is set (Y), then it is determined in step 302 whether an unlock signal for releasing the lock is received. If it is received (Y), the automatic lock mode flag F1 is set to 0 in step 303, and an answerback 3 (see FIG. 15) is produced in step 304 to indicate to the user that the automatic lock mode is released. The answerback 3 may be given by a relatively long buzzer beep or by a voice message saying, for example, "Automatic lock is released". It will also be appreciated that the unlock signal in step 302 can be replaced by some other signal such as pressing the lock button once again.

Next, in step 305, it is determined whether the automatic lock completion flag F4 has changed from 0 to 1, that is, whether the automatic lock has just been completed. Here, as the automatic lock activation process (see FIGS. 10, 11, and 12) is completed, meaning that the automatic lock completion flag F4 has changed from 0 to 1, the answer in step 305 is Y. The process thus proceeds to step 306 where the timer T3 is set to three seconds. In step 307, the timer T3 is monitored to check whether three seconds have elapsed, and if three seconds have not yet elapsed, it is determined in step 308 whether the door knob is turned on. If the door knob is on (Y), the door is unlocked in step 309, and the automatic lock completion flag F4 is reset to 0 in step 310, to terminate the process. On the other hand, if it is confirmed in step 307 that three seconds have elapsed, the automatic lock completion flag F4 is reset to 0 and the process is terminated without unlocking the door, regardless of whether the door knob is on or not, that is, even when the door knob is pulled.

Figure 14:
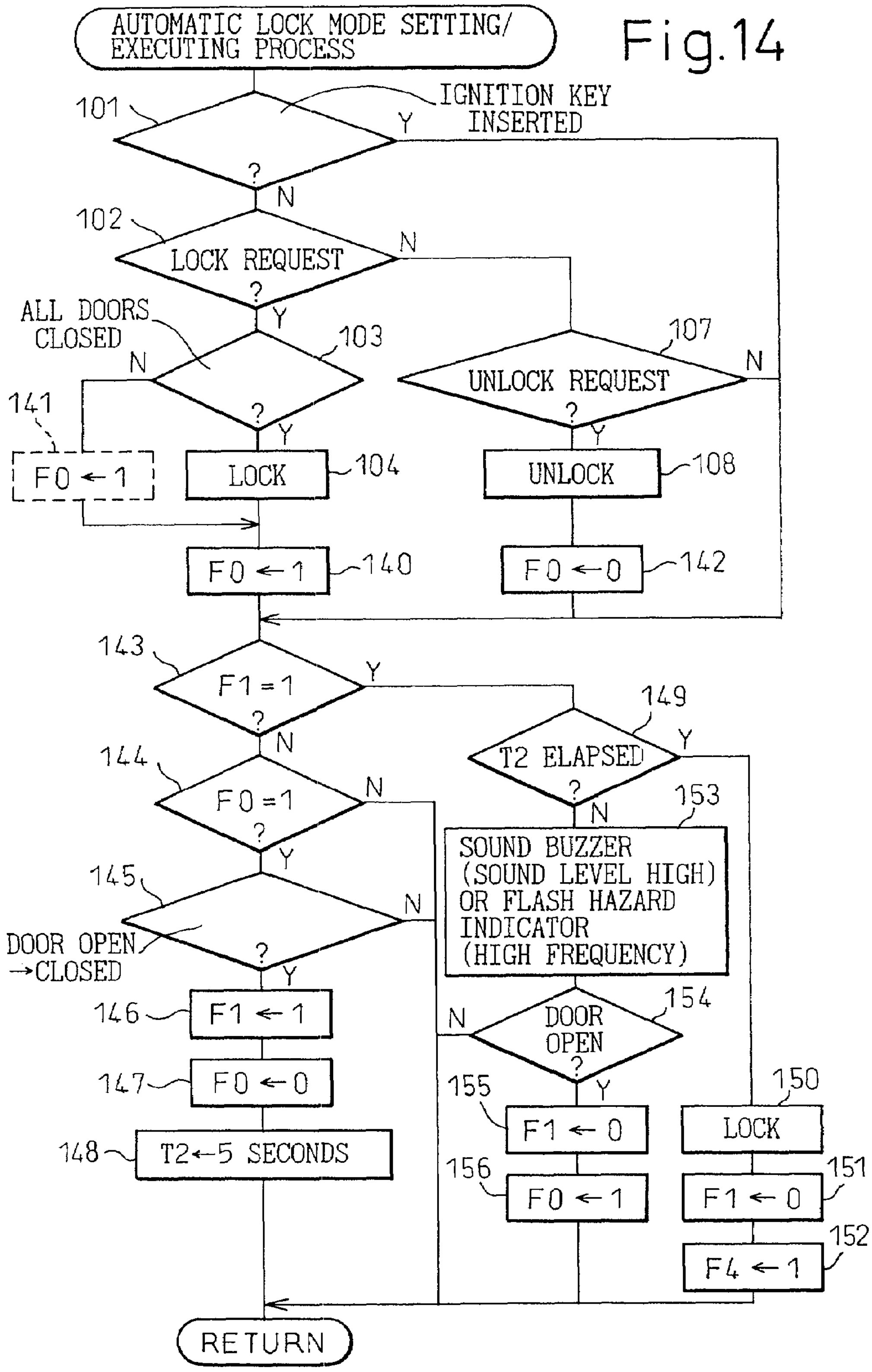
FIG. 14 is a flowchart illustrating an embodiment of an automatic lock mode setting/executing process in the key-less entry system according to one embodiment of the present invention.

FIG. 14 is a flowchart illustrating one embodiment of the present invention which combines the automatic lock mode setting process with the automatic lock executing process. In the embodiments thus far described, the door lock/unlock mechanism was set to the automatic lock mode (1) when a lock request was received, (2) when the door was opened after the lock request was received, or (3) when an automatic lock request was received. In contrast, in the embodiment shown in FIG. 14, the automatic lock mode is entered when the door is closed after the lock request is received, and the door is locked when a predetermined time has elapsed. Accordingly, in this embodiment, upon confirming in step 103 that all the doors are closed, the doors are locked in step 104, and after that, the automatic lock mode preparation flag F0 is set in step 140 (set to 1). On the other hand, if it is determined in step 103 that any one of the doors is open, the automatic lock mode preparation flag F0 is set in step 140 or step 141 without locking the doors. If it is determined in step 102 that there is no door lock request, and in step 107 that a door unlock request is received, then the automatic lock mode preparation flag F0 is set to 0 in step 142.

When the automatic lock mode preparation flag F0 is set to 1 or 0 as described above, it is determined in step 143 whether the automatic lock mode flag F1 is set. Since the automatic lock mode flag F1 is not yet set at this point in time, the N branch of step 143 is followed to proceed to step 144 to determine whether the automatic lock mode preparation flag F0 is set. If there is a door lock request in step 102, the automatic lock mode preparation flag F0 is set to 1; therefore, the Y branch of step 144 is followed to proceed to step 145 to determine whether the door has made a transition from the open state to the closed state. If the answer is Y in step 145, that is, if the door is closed after the reception of the lock request, the automatic lock mode flag F1 is set in step 146, the automatic lock mode preparation flag is cleared (set to 0) in step 147, and the timer T2 is set to five seconds in step 148. In this condition, when the process starting from step 101 is repeated, this time the answer is Y in step 143, and the process proceeds to step 149 to check the timer T2 to see if five seconds have elapsed. If it is determined in step 149 that five seconds have elapsed, the door is immediately locked in step 150, the automatic lock mode flag F1 is cleared in step 151, and the automatic lock completion flag F4 is set in step 152, to terminate the process.

On the other hand, if it is determined in step 149 that five seconds have not elapsed yet, the buzzer is sounded or the hazard lamp flashed in step 153 to alert the user that the automatic door lock mode has been entered. Next, it is confirmed in step 154 that the door is not open (N), and again in step 149 the timer T2 is checked to see if five seconds have elapsed. If five seconds have elapsed, the process starting from step 150 is performed to automatically lock the door.

If it is determined in step 154 that the door is open, the automatic lock mode flag F1 is cleared in step 155, and the automatic lock mode preparation flag F0 is set in step 156. The process then returns to step 101 to repeat the process; this time, as the automatic lock mode flag F1 is set to 0, the answer is N in step 143 and, as the automatic lock mode preparation flag F0 is set to 1, the answer is Y in step 144 and, in the next step 145, the door open/closed state is checked. If the door once opened in step 154 remains open, the answer is N in step 145, and the process returns to step 101 to repeat the above process once again. On the other hand, if the door once opened in step 154 is thereafter closed, the answer is Y in step 145, and the process proceeds through steps 146 and 147 to step 148 where the timer T2 is again set to five seconds. Then, after five seconds have elapsed, the process starting from step 150 is performed to lock the door. In this way, when the door is closed after reception of the lock request, the automatic lock mode is set, and when the predetermined time (in the above embodiment, five seconds) has elapsed, the door is locked.

Figure 15:
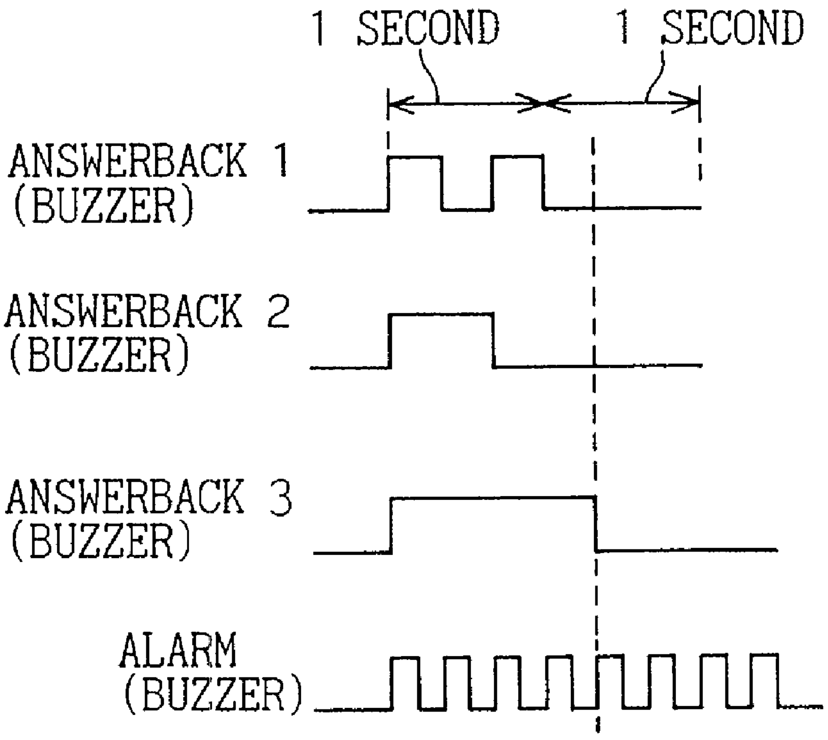
FIG. 15 is a diagram showing various kinds of answer-backs used in the key-less entry system according to one embodiment of the present invention.

FIG. 15 is a diagram for explaining the three kinds of answerbacks and the alarm described above. The answerback 1 consists of relatively short buzzer tones; this indicates that the automatic lock mode has been set, and can be replaced by a voice message "The door will be automatically locked when closed". The answerback 2 consists of a little longer buzzer tone, and indicates that the doors have been locked. The answerback 3 consists of a relatively long buzzer tone; this indicates that the automatic lock mode has been released, and can therefore be replaced by a voice message "Automatic lock is released". The alarm consists of short buzzer tones; this provides a warning that a door is open, and can therefore be replaced by a voice message such as "Door is open". The answerbacks 1, 2, and 3, and the alarm may each be replaced by a flashing of a hazard lamp or other lamp means (LED or the like).

The embodiments of FIGS. 3 to 5 described above offer a further advantage. That is, when the user exits the vehicle and performs the normal lock operation using the transmitter, the user may notice that a door is open or is not completely closed, as is often the case. In that case, after closing the door completely, the user would have to operate the transmitter once again to lock the door, but in these embodiments, as the automatic lock mode is entered as a result of the first lock operation performed on the transmitter, the user can be saved the trouble of operating the transmitter once again to lock the door after the door is re-closed. Further, in the above embodiments, the transmitter has been configured to transmit the lock signal and the unlock signal as separate signals, but the lock and unlock functions may be integrated into one button to transmit only one kind of signal for locking/unlocking operation; in this case, whether the signal is for locking or unlocking is determined according to the lock/unlock state of the door when the signal is received by the onboard unit.

As described above with reference to the various embodiments, the key-less entry system of the present invention is configured so that the automatic lock is executed when a lock request is received from the transmitter and when the transition of the door from the open state to the closed state is detected. With this configuration, if the automatic lock mode is set by operating the transmitter, for example, while the user is still inside the vehicle and has not yet opened the door to get outside the vehicle, or after the user opens the door or gets outside the vehicle by opening the door, then the door is automatically locked when the driver side door is closed. This, in turn, means that even when the automatic lock mode is set, the door will not be locked as long as the driver side door is not closed. This serves to eliminate inconveniences, such as the door being locked against the intention of the user while he is doing some work, or the user having to operate the transmitter to lock the door when his hands are occupied, and a convenient-to-use key-less entry system can thus be achieved.

What is claimed is:

1. A key-less entry system comprising:

a transmitter configured to transmit a door lock signal when operated by a user;

a receiver configured to receive said door lock signal from said transmitter;

a door lock mechanism controlled by an output signal from said receiver; and means for detecting whether a key is inserted into an ignition key slot, wherein said door lock mechanism automatically locks a door only if, after receipt of the door lock signal that is manually invoked by the user, but before receipt of any unlock signal, a closed driver side door is opened and then closed, and said means for detecting detects that the key is not inserted into the ignition key slot.

2. A key-less entry system as claimed in claim 1, wherein the door lock mechanism automatically locks the door when the door has made a transition from the open state to the closed state within a predetermined time after the reception of the lock signal.

3. A key-less entry system as claimed in claim 1 further comprising means for annunciating a door open state when any one door, other than the driver side door, is detected as being open at the time that the driver side door has made a transition from the open state to the closed state after reception of the lock signal.

4. A key-less entry system as claimed in claim 1, wherein the door lock mechanism automatically locks the door by waiting for a predetermined time after detecting that the driver side door has made a transition from the open state to the closed state.

5. A key-less entry system as claimed in claim 1 further comprising means for annunciating a state transition when the driver side door has made a transition from the open state to the closed state after reception of the lock signal.

6. A key-less entry system as claimed in claim 1, wherein the door lock mechanism does not automatically lock the door if a key is inserted in an ignition key cylinder.

7. A key-less entry system as claimed in claim 1, wherein the door lock mechanism releases a lock when a door knob switch is turned on within a predetermined time after the door lock mechanism automatically locks the door.

8. A key-less entry system as claimed in claim 1, wherein when the lock signal is transmitted from the transmitter while the driver side door is closed, then the door lock mechanism automatically locks the door when the door is opened first and then closed.

9. A key-less entry system comprising:

a transmitter configured to transmit a door lock signal and a door automatic lock signal when operated by a user;

a receiver configured to receive said door lock signal and said door automatic lock signal from said transmitter;

a door lock mechanism controlled by an output signal from said receiver; and means for detecting whether a key is inserted into an ignition key slot;

wherein said door lock mechanism automatically locks a door only if, after receipt of the door automatic lock signal that is manually invoked by the user, but before receipt of any unlock signal, a closed driver side door is opened and then closed, and said means for detecting detects that the key is not inserted into the ignition key slot.

10. A key-less entry system as claimed in claim 9, wherein the door lock mechanism automatically locks the door lock when the door has made a transition from the open state to the closed state within a predetermined time after the reception of the automatic lock signal.

11. A key-less entry system as claimed in claim 9, wherein the automatic lock signal is generated by transmitting the door lock signal continuously for a predetermined time.

12. A key-less entry system as claimed in claim 9, wherein the automatic lock signal is generated by transmitting the door lock signal a predetermined number of times within a predetermined time.

13. A key-less entry system as claimed in claim 9, wherein the door lock mechanism releases a lock when a door knob switch is turned on within a predetermined time after the door lock mechanism automatically locks the door.

14. A key-less entry system as claimed in claim 9, wherein the door lock mechanism cancels the execution of the automatic lock when an automatic lock cancel operation is detected before executing the automatic lock.

15. A key-less entry system as claimed in claim 9 further comprising means for annunciating a door open state when any one door, other than the driver side door, is detected as being open at the time that the driver side door has made a transition from the open state to the closed state after reception of the automatic lock signal.

16. A key-less entry system as claimed in claim 9, wherein the door lock mechanism automatically locks the door by waiting for a predetermined time after detecting that the driver side door has made a transition from the open state to the closed state.

17. A key-less entry system as claimed in claim 9 further comprising means for annunciating a state transition when the driver side door has made a transition from the open state to the closed state after reception of the automatic lock signal.

18. A key-less entry system as claimed in claim 9, wherein the door lock mechanism does not automatically lock the door if a key is inserted in an ignition key cylinder.

19. A key-less entry system comprising a transmitter configured to transmit a door lock signal and an automatic lock signal, and a vehicle onboard unit configured to execute a door automatic lock by detecting that a driver side door has made a transition from an open state to a closed state after reception of the automatic lock signal, wherein the automatic lock signal is generated by a combination of a lock signal and an unlock signal transmitted in sequence within a predetermined time.

20. A key-less entry system comprising a transmitter configured to transmit a door lock signal and an automatic lock signal, and a vehicle onboard unit configured to execute a door automatic lock by detecting that a driver side door has made a transition from an open state to a closed state after reception of the automatic lock signal, wherein the transmitter is equipped with a lock button for transmitting the door lock signal, an unlock button for transmitting a door unlock signal, and a shift button, and the automatic lock signal is transmitted by operating the lock button in combination with the shift button.

21. A method for automatically locking a vehicle door, the method comprising:

receiving an automatic lock command manually invoked by a user when the vehicle door is closed;

determining whether the vehicle door has opened and then closed after the receipt of the manually invoked automatic lock command but before receipt of any unlock signal; and only if the vehicle door has opened and then closed after the receipt of the manually invoked automatic lock command but before receipt of any unlock signal, automatically locking the vehicle door.

* * * * *

UNITED STATES PATENT AND TRADEMARK OFFICE

CERTIFICATE OF CORRECTION

PATENT NO. : 7,301,437 B2
APPLICATION NO. : 10/163083
DATED : November 27, 2007
INVENTOR(S) : Yoshihiro Sasaki et al.

It is certified that error appears in the above-identified patent and that said Letters Patent is hereby corrected as shown below:

| | |
|---|---|
| Column 13, line 42, claim 10 | Delete "automatically locks the door lock" Insert --automatically locks the door-- |

Signed and Sealed this

Twentieth Day of May, 2008

JON W. DUDAS
*Director of the United States Patent and Trademark Office*